(12) United States Patent
Ranjan et al.

(10) Patent No.: US 11,483,384 B2
(45) Date of Patent: Oct. 25, 2022

(54) APPLICATION MIGRATIONS

(71) Applicant: HEWLETT PACKARD ENTERPRISE DEVELOPMENT LP, Houston, TX (US)

(72) Inventors: Jyoti Ranjan, Bangalore (IN); Abhishek Kumar, Bangalore (IN); Unmesh Gurjar, Bangalore (IN); Ajay Kumar Bajaj, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/820,557

(22) Filed: Mar. 16, 2020

(65) Prior Publication Data
US 2020/0304571 A1    Sep. 24, 2020

(30) Foreign Application Priority Data
Mar. 19, 2019  (IN) .............................. 201941010746

(51) Int. Cl.
| | | |
|---|---|---|
| *H04L 29/08* | (2006.01) | |
| *H04L 12/24* | (2006.01) | |
| *H04L 67/1095* | (2022.01) | |
| *H04L 41/14* | (2022.01) | |

(52) U.S. Cl.
CPC .......... *H04L 67/1095* (2013.01); *H04L 41/14* (2013.01)

(58) Field of Classification Search
CPC ............................ H04L 67/1095; H04L 41/14
USPC ....................................................... 709/201
See application file for complete search history.

(56) References Cited

U.S. PATENT DOCUMENTS

| | | | |
|---|---|---|---|
| 8,498,890 B2 * | 7/2013 | Fong | G06Q 10/06316 |
| 8,671,404 B2 | 3/2014 | Dehaan et al. | |
| 9,575,797 B2 | 2/2017 | Linton et al. | |
| 9,594,590 B2 | 3/2017 | Hsu | |
| 9,612,765 B2 | 4/2017 | Huang et al. | |
| 9,697,266 B1 * | 7/2017 | Nagesh | G06F 9/45558 |
| 9,990,228 B1 | 6/2018 | Jayanthi et al. | |

(Continued)

OTHER PUBLICATIONS

TechTarget, Definition deep learning, Apr. 1, 2018, retrieved via URL: https://searchenterpriseai.techtarget.com/definition/deep-learning-deep-neural-network (Year: 2018).*

(Continued)

*Primary Examiner* — Schquita D Goodwin
(74) *Attorney, Agent, or Firm* — Hewlett Packard Enterprise Patent Department

(57) ABSTRACT

In some examples, a system may include a processing resource and a memory resource. The memory resource may store machine-readable instructions to cause the processing resource to create a migration plan, defining characteristics of a migration of an application from a native computing data center to a computing cloud of a plurality of distinct candidate computing clouds, based on: a first migration constraint for the application determined from an analysis of historical behavior of the application executed on the native computing data center; a second migration constraint for the application determined from an analysis of administrator cloud migration preferences for the application; and a cloud computing characteristic of each of the plurality of distinct candidate computing clouds.

22 Claims, 5 Drawing Sheets

(56) References Cited

U.S. PATENT DOCUMENTS

| | | |
|---|---|---|
| 10,445,086 B2 | 10/2019 | Jozsa et al. |
| 2009/0282401 A1 | 11/2009 | Todorova |
| 2012/0311154 A1* | 12/2012 | Morgan .............. H04L 67/1002 709/226 |
| 2013/0091285 A1 | 4/2013 | Devarakonda et al. |
| 2013/0339419 A1* | 12/2013 | Emaru .................... H04L 67/42 709/201 |
| 2013/0339941 A1 | 12/2013 | Shelton |
| 2014/0108350 A1* | 4/2014 | Marsden ................. H04L 69/40 709/219 |
| 2014/0181792 A1 | 6/2014 | Fanning et al. |
| 2014/0379539 A1 | 12/2014 | Doddavula et al. |
| 2015/0222702 A1* | 8/2015 | Salle ..................... G06F 9/4856 709/201 |
| 2015/0237129 A1* | 8/2015 | Baker ................. H04L 41/0813 709/219 |
| 2016/0077869 A1 | 3/2016 | Grueneberg et al. |
| 2016/0134557 A1 | 5/2016 | Steinder et al. |
| 2016/0191623 A1 | 6/2016 | Vasudevan et al. |
| 2016/0330277 A1 | 11/2016 | Jain et al. |
| 2016/0378525 A1 | 12/2016 | Bjorkengren |
| 2016/0380916 A1 | 12/2016 | Gnaneswaran et al. |
| 2017/0017505 A1 | 1/2017 | Bijani et al. |
| 2017/0034016 A1 | 2/2017 | Carroll et al. |
| 2017/0308330 A1 | 10/2017 | Suresh et al. |
| 2017/0315795 A1 | 11/2017 | Keller |
| 2017/0366606 A1* | 12/2017 | Ben-Shaul .......... H04L 67/2876 |
| 2017/0371696 A1 | 12/2017 | Prziborowski et al. |
| 2018/0191599 A1* | 7/2018 | Balasubramanian ... H04L 67/10 |
| 2018/0213036 A1* | 7/2018 | Vasetsky ............. H04L 41/0896 |
| 2018/0239555 A1* | 8/2018 | Cao ........................ G06F 3/0608 |
| 2019/0149617 A1* | 5/2019 | Gao ..................... H04L 67/148 709/223 |
| 2019/0222467 A1* | 7/2019 | Mittal ................... G06F 3/0605 |
| 2019/0288915 A1* | 9/2019 | Denyer ..................... G06F 9/54 |
| 2020/0004582 A1* | 1/2020 | Fornash ............... G06F 9/4856 |

OTHER PUBLICATIONS

MathWorks, What Is Deep Learning? 3 things you need to know, Mar. 15, 2019, retrieved via URL: https://www.mathworks.com/discovery/deep-learning.html (Year: 2019).*

Chichin et al., "Smart Cloud Marketplace—Agent-based Platform for Trading Cloud Services", IEEE/WIC/ACM International Joint Conferences on Web Intelligence (WI) and Intelligent Agent Technologies (IAT), 2014, pp. 388-395.

Extended European Search Report received for EP Patent Application No. 19170025.1, dated Sep. 25, 2019, 11 pages.

Lubin, E.; "VM2Docker: Automating the Conversion from Virtual Machine to Docker Container"; Feb. 2015; 68 pages.

Son et al., "Migration scheme based machine learning for QoS in cloud computing: Survey and research challenges", 4th International Conference on Computer Applications and Information Processing Technology (CAIPT), Aug. 8-10, 2017, 4 pages.

Claus Pahl, "Containerization and the PaaS Cloud," in IEEE Cloud Computing, vol. 2, No. 3, May-Jun. 2015, pp. 24-31.

Sáez et al., "Dynamic Tailoring and Cloud-Based Deployment of Containerized Service Middleware," 2015 IEEE 8th International Conference on Cloud Computing, New York, NY, 2015, pp. 349-356.

Zwischenzugs, "Convert Any Server to a Docker Container," available online at <https://web.archive.org/web/20150706053444/http://zwischenzugs.tk/index.php/2015/05/24/convert-any-server-to-a-docker-container/>, May 24, 2015, 4 pages.

* cited by examiner

APPLICATION MIGRATIONS

BACKGROUND

Cloud computing may provide computing services to users by providing access to an underlying computing resources such as servers, storage, databases, networking, software, analytics, intelligence, processing power, etc. over a network such as the Internet. Computing clouds may include various amounts of computing resource having various computing characteristics.

Computing clouds have affected the way information technology (IT) infrastructure is consumed in a self-service mode. Further, with the availability and utilization of virtualization technologies, hybrid computing environments may be utilized that may accommodate deployment of a variety of workloads in a variety of virtual infrastructure ranging from a private data center to a public computing cloud. In some instances, applications and/or their corresponding data may be moved, or migrated, between computing environments.

DETAILED DESCRIPTION

Figure 1:
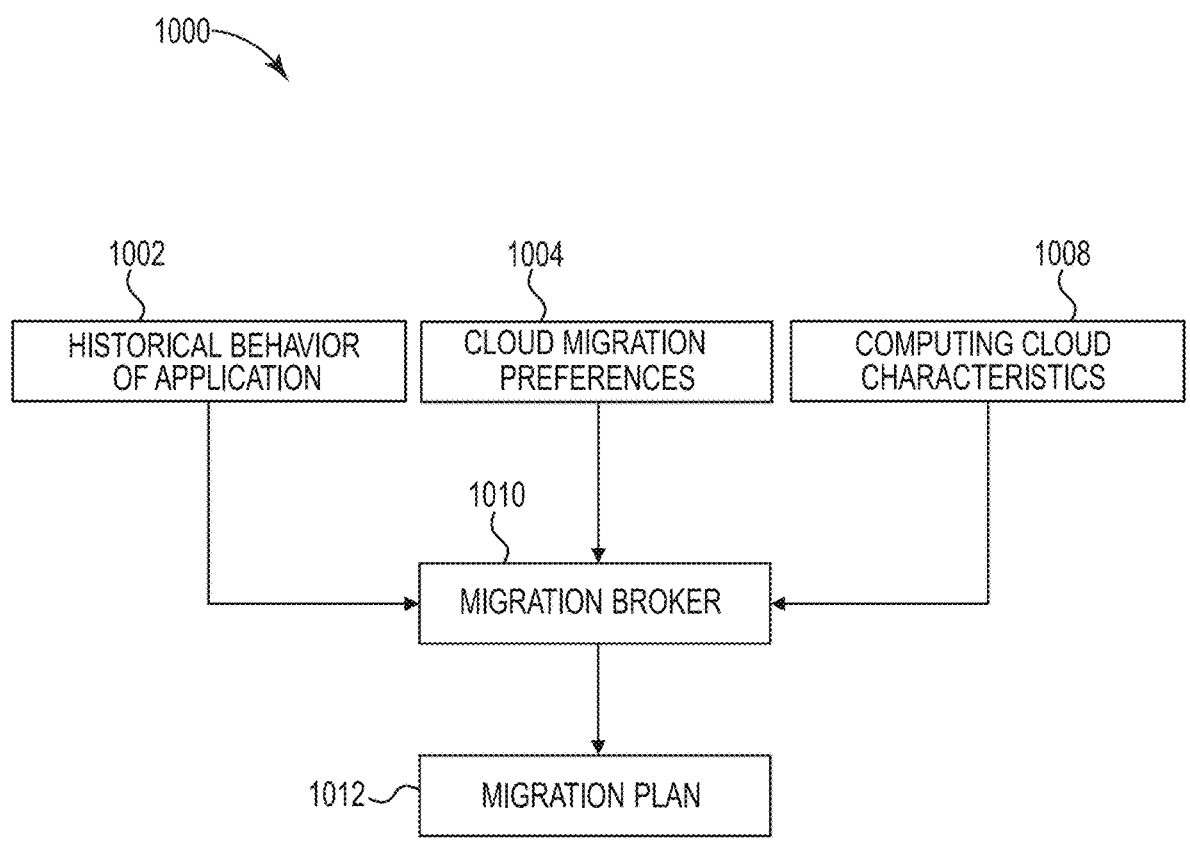
FIG. 1 illustrates an example of a system of application migrations consistent with the present disclosure.

Applications and their workloads may be migrated between computing environments. For example, applications and their workloads may be migrated between private data centers and public computing clouds. Migration may result in cost savings, agility increases, availability of new services, simplification of management, decreased maintenance, increased computational resource allocation, etc. for operating given applications and application workloads. Migration may allow for scaling an application to meet demand without absorbing the entire costs associated with achieving and/or maintaining that scale.

Different computing environments may have different characteristics. For example, a first private data center may have different characteristics than a second private data center. A first computing cloud may have different characteristics than a second computing cloud. And a private data center may have different characteristics than a computing cloud. As such, choosing a computing environment to host an application and its workload may include choosing a computing environment with characteristics that may affect the execution of the application and its workload.

Decisions regarding which computing environment to place an application or workload in and/or migrate the application or workload to may be based on guesswork regarding the operation of the application and which computing environment will accommodate it. Often, computing environment selections may result in an under allocation of computing resources resulting in deceased performance, an over allocation of computing resources resulting in computational waste and cost over runs, inefficient allocation of capital, etc. as the variables associated with environment selection are many, sometimes conflicting, and are based on uniformed assumptions regarding the operation of the application and its workloads.

In contrast, examples consistent with the present disclosure may create migrations plans that are optimized to a variety of constraints. The examples may collect and produce a variety of data to develop an understanding of applications, computing clouds, migration preferences, costs, etc. and utilize such data to analytically determine a migration plan that extracts a maximum benefit from available choices while minimizing negative variables such as cost and leaving availability, compliance, and/or governance intact. Examples consistent with the present disclosure may include a system. The system may include a processing resource and a memory resource storing machine-readable instructions executable by the processing resource to create a migration plan, defining characteristics of a migration of an application from a native computing data center to a computing cloud of a plurality of distinct candidate computing clouds. The migration plan may be created based on a first migration constraint for the application determined from an analysis of historical behavior of the application executed on the native computing data center, a second migration constraint for the application determined from an analysis of administrator cloud migration preferences for the application, and a cloud computing characteristic of each of the plurality of distinct candidate computing clouds.

FIG. 1 illustrates an example of a system 1000 of application migrations consistent with the present disclosure. The system 1000 may include components of and/or be utilized with system 2014 of FIG. 2, the application migration management device 3042 of FIG. 3, the non-transitory memory 4056 of FIG. 4, and/or the method 5062 of FIG. 5.

The system 1000 may include a migration broker 1010. The migration broker 1010 may include machine-readable instructions executable by a processing resource. The migration broker 1010 may be a component of a cloud management platform. For example, the migration broker 1010 may be a portion of a cloud management platform delivered as a managed service to manage applications, workloads, and/or computing resources.

The migration broker 1010 may collect and/or analyze data from various sources. The migration broker 1010 may utilize the data to create a migration plan 1012. For example, the migration broker 1010 may utilize the data to identify migration constraints. As utilized herein, a migration constraint may include a preference, rule, metric, condition, etc. that may be imposed on a migration of an application from a first computing environment to a second computing environment. That is, a migration constraint may include a targeted preference, rule, metric, condition, etc. to be achieved and/or biased towards in creating a migration plan 1012 for migrating an application from a first computing environment to a second computing environment.

The migration plan 1012 may include instructions for migrating an application from a first computing environment to a second computing environment. For example, the migration plan 1012 may include instructions that define characteristics of a migration of an application from a native computing data center to a computing cloud of a plurality of distinct candidate computing clouds. The native computing data center may include the computing data center, private cloud, public cloud, etc. where the application is initially executing prior to its migration. Each candidate computing cloud may include a computing data center, private cloud, public cloud, etc. where the application may be migrated. The plurality of candidate computing clouds may be a group of computing cloud candidates selected from a group of available and/or preapproved computing cloud providers for an organization.

The migration plan 1012 may be utilized to create an infrastructure topology template for performing the migration and configuring the application and/or workload at the destination computing environment. Again, the migration plan 1012 may be created from a plurality of data sets available to the migration broker 1010.

For example, the migration broker 1010 may identify a first migration constraint for the application being migrated. The first migration constraint may be determined from an analysis of historical behavior of the application 1002. For example, the first migration constraint may be determined from an analysis of the historical behavior of the application 1002 observed while the application is executed on the native computing data center, from which it is being transferred. In some examples, deep machine learning may be applied to the historical behavior patterns of the application 1002 observed and/or collected during the execution of the application in the native computing data center in order to identify the first migration constraint. Deep machine learning may include a deep structure learning or hierarchical learning method based on learning data representations as opposed to task-specific formulas. The deep machine learning may be supervised, semi-supervised, or unsupervised learning whereby an artificial neural network is trained in levels to transform its input data into more abstract and composite representations of the data. For example, historical behavior of an application 1002 may include metrics associated with application execution that are transformed into a more abstract and composite representation such as the first migration constraint.

For example, deep machine learning may be applied to access, compile, and/or analyze telemetry data of the application from executions of the application in the native computing data center. As used herein, telemetry data of the application may be data generated by the application during its historical executions in its initial computing data center.

For example, telemetry data may include metrics of computational resource consumption, computational resource allocation, computational resource utilization, application performance, etc. metrics. For example, the telemetry data may include the average age of an application execution, a minimum computational resource utilization during application execution, a maximum computational resource allocation during application execution, an average computational resource allocation during application execution, etc. The telemetry data may include alerts generated by the application from executions of the application in the native computing data center. The telemetry data may include logs generated by the application from executions of the application in the native computing data center. The telemetry data may include compute configurations for executing the application in the native computing data center. For example, the telemetry data may include the central processing unit (CPU) allocation and/or utilization, the random-access memory (RAM) allocation and/or utilization, and/or the storage allocation and/or utilization for executing the application in the native computing data center.

The telemetry data may be analyzed to determine compute and data utilization patterns associated with execution of the application. The determined patterns may be utilized to define the first migration constraint. The first migration constraint may be a single migration constraint and/or a plurality of migration constraints. The first migration constraint may be assigned a weight (e.g., relative to other of the plurality of first migration constraints, relative to a second migration constraint, etc.) based on predetermined or learned significance of each underlying data point.

As such, the first migration constraint for the application may be determined from the historical behavior of an application 1002 executed on the native computing data center, such as the telemetry data collected during such executions. The first migration constraint may include an application lifecycle characteristic constraint derived from historical telemetry data collected from an execution of a workload of the application executing on the native computing data center. A lifecycle characteristic constraint may include a constraint to the migration plan that is based on data indicative of a lifecycle characteristic of the application. That is, a lifecycle characteristic constraint may include an observed and/or projected pattern of resource utilization for the application in the future based on its past execution. For example, lifecycle characteristics constraints may include determinations and/or projections of application execution patterns such as whether the application has run or will run periodically like a crawl job versus whether the application has run or will run twenty-four hours a day and seven days a week for an extended period of time such as a year to three years. Such constraints may be determined by analyzing the historical duration, average age, execution patterns, etc. of the application executing on the native computing data center. In some examples, the application lifecycle characteristic constraint may include a projection of whether an application or group of applications is expected to be running one to three years from the migration date.

For example, the lifecycle characteristic constraint may include a constraint specifying and/or utilizable to determine what type of instances on a candidate computing cloud match the specific application workload from a costing perspective. For example, a candidate cloud may offer specific instance types such as on-demand instances, reserved instances, and spot instances. Each type of instance may be associated with a unique costing structure. For example, on-demand pricing may have a first cost level, reserved instances may be associated with a second cost level that is offered at a forty to sixty percent discount to the first cost level, and spot instances may be associated with a second cost level that is offered at a sixty to ninety percent discount to the first cost level. On-demand instances may involve no upfront commitment to the instance from the customer, reserved instances may involve a one to three-year commitment to the instance from the customer, and a spot instance may allocate unused computational resources to execute customers applications and may involve no specific commitment to an instance. As such, an application determined, from historical behavior of an application 1002, to run periodically like a crawl job may be assigned a lifecycle characteristic migration constraint such as a designation as suitable or optimal for a spot instance. Whereas, an application determined, from historical behavior of an application 1002, to run twenty-four hours a day and seven days a week for an extended period of time such as one year to three years may be assigned a lifecycle characteristic migration constraint such as a designation as suitable or optimal for a reserved instance.

Additionally, the first migration constraint may include an application configurable attribute constraint. For example, the first migration constraint may include an application computational resource allocation constraint derived from historical telemetry data collected from an execution of a workload of the application executing on the native computing data center. For example, an application computational resource allocation constraint may include a specification and/or preference of computational resource, such as CPU performance, RAM capacity, disk storage capacity, etc., allocation to be configured at the candidate computing cloud. The application computational resource allocation constraint may be calculated based on the computational resources allocated to and/or utilized by the application during its execution at its native computing data center. The application computational resource allocation constraint may be calculated based on the peak computational resource consumption of allocated resources and/or the frequency of computational resource consumption of allocated resources by the application during its execution at its native computing data center. The application computational resource allocation constraint may be calculated based on an average computational resource consumption of allocated resources by the application during its execution at its native computing data center.

The application computational resource allocation constraint may be based on a trend and/or growth rate of computational resource consumption of allocated resources identified for the application from its patterns of resource consumption execution at its native computing data center. For example, the application computational resource allocation constraint may specify a projected trend and/or growth rate of computational resource consumption by the application to be accommodated for in selecting a computational resource allocation configuration of a candidate computing cloud.

The application computational resource allocation constraint may be calculated based on a historical frequency of data backup and/or an amount of data backed up during each backup operation by the application during its execution at its native computing data center. For example, a frequency of data backup and/or amount of data backed up per backup may be predicted from the historical frequency of data backup and/or an amount of data backed up during each backup operation by the application during its execution at its native computing data center. As such, the application computational resource allocation constraint may specify a backup frequency and/or data amount per backup to be accommodated for in selecting a computational resource allocation configuration of a candidate computing cloud.

The application computational resource allocation constraint may include a definition and/or preference of a starting application infrastructure and a configuration or allocation of the computational resources of the candidate cloud to which the application will be migrated. The application computational resource allocation may include a definition and/or preference of an auto scaling strategy. For example, the application computational resource may include a definition and/or preference specifying instances where auto scaling of computational resource allocations to increase and/or decrease with the demands of the executing application should be configured at the candidate cloud to which the application will be migrated. The application computational resource allocation constraint may include a definition and/or preference of performance configurations of the candidate clouds and/or computational resources allocated to the application at the candidate cloud. For example, the application computational resource allocation constraint may include a definition and/or preference of an appropriate class or performance specification of computational resources allocated to the application at the candidate cloud. In an example, the application computational resource allocation constraint may include a definition and/or preference of an SSD storage resource to be allocated to the application based on historical behavior of the application 1002 including a detected high rate of input/output operations per second (IOPS) by the application during its execution at its native computing data center.

The first migration constraint may include an application data availability constraint derived from historical telemetry data collected from an execution of a workload of the application executing on the native computing data center. An application data availability constraint may include a definition and/or a preference of a backup-strategy for data backup when executing the application at the candidate computing cloud. For example, the application data availability constraint may specify a definition and/or a preference of an object storage solution, such as Amazon Web Services S3, Amazon Web Services S3 with Glacier, and/or Amazon Glacier, based on which of the object storage solutions may accommodate the application execution at the candidate computing cloud. The application data availability constraint may be determined based on a minimum, maximum, and/or average load an application was subjected to and what the computational resource consumption was under each of those loads while the application executed at its native computing data center. The application data availability constraint may be determined based on an availability or high availability (HA) preference for the application determined from the application executed at its native computing data center.

The application data availability constraint may be determined based on whether the application has any constraints regarding specific candidate computing cloud providers, specific data centers and/or data center geographies that may be utilized to execute the application. For example, the application data availability constraint may be determined based on whether an application is limited to executing on data centers located in a specific country and/or located outside of a specific country.

The application data availability constraint may be determined based on the behavior of the system and/or the application during historical failures while the application was executing at its native computing data center. For example, the application data availability constraint may be determined based on whether the application or system executing the application utilized administrative intervention upon a failure and/or if the application or system executing the application utilized data backup and was able to re-start itself automatically upon a failure while the application was executing at its native computing data center.

The first migration constraint may include a data handling compliance constraint derived from historical telemetry data collected from an execution of a workload of the application executing on the native computing data center. For example, the data handling compliance constraint may include a definition and/or preference for compliance and/or governance standard to be adhered to during an execution of the application at the candidate computing cloud to which the application is to be migrated. For example, the data handling compliance constraint may include a specification of an applicable, an applicable regulating country, an applicable compliance standard, an applicable governance standard, an applicable contingency procedure applicable in the event of abnormalities, a set of data centers to host data locally for the application that comply with the compliance regulations, a set of acceptable data center geographies to host data locally for the application that comply with the compliance regulations, etc.

The data handling compliance constraint may be based on historical telemetry data collected from historical executions of a workload of the application executing on the native computing data center, such as data regarding the type of application, the type of data, the way the data was handled, or structured, regulatory constraints enforced at the application, etc. For example, the data handling compliance constraint may be based on telemetry data such as data indicating that the application handles patient data, banking data, confidential data, governmentally protected data, defense data, etc.

Additionally, the migration broker 1010 may identify a second migration constraint for the application being migrated. The second migration constraint may be determined from an analysis of administrator cloud migration preferences 1004 for the application. For example, an administrator of the application and/or the native computing data center may input cloud migration preferences 1004 to the migration broker 1010 that are specific to an application, such as the application from which the historical behavior 1002 is collected and/or the application to be migrated to a candidate cloud. The cloud migration preferences may, in some examples, include the credentials or other access information for the migration broker 1010 to utilize in order to access the historical behavior, such as the historical telemetry data, of the corresponding application.

The cloud migration preferences may include a specification of a preference of sets or groups of applications or portions of applications to be migrated. For example, the cloud migration preferences may specify of a computational instance separation preference for the application, defining preferred sets or groups of applications or portions of applications to be migrated together to a same candidate computing cloud destination.

The cloud migration preferences may include a specification of a cloud computing type, a specific computing cloud provider, a specific computing cloud, a set of cloud computing data centers, a data center geography, a data center infrastructure architecture, etc. applicable to the candidate computing cloud to which the corresponding application may be migrated. The cloud migration preferences may specify an application lifecycle characteristic, an application computational resource allocation preference, an application data availability preference, an application data backup policy preference, an application data handling compliance characteristic, etc. applicable to the application upon migration.

The cloud migration preferences may specify whether the application to be migrated may be converted between a virtual machine and/or a container computational architecture. That is, the cloud migration preferences may specify attributes that influence whether an application operating as a virtual machine may be containerized, or vice versa, when migrating to a candidate computing cloud.

Again, the second migration constraint may be determined from an analysis of administrator cloud migration preferences 1004 for the application. As such, the second migration constraint may include a computing cloud type preference determined from the administrator cloud migration preferences input by an administrator. The second migration constraint may include an application data and computational instance separation preference for the application determined from the administrator cloud migration preferences input by an administrator. For example, the second migration constraint may include specify whether application data and compute data from executions of the application should be stored, handled, and/or executed separately following migration.

The second migration constraint may include an application data backup policy preference for the application determined from the administrator cloud migration preferences input by an administrator. The second migration constraint may include an ability of the application to convert between a virtual machine architecture and a container architecture determined from the administrator cloud migration preferences input by an administrator.

The second migration constraint may be a single migration constraint and/or a plurality of migration constraints. The second migration constraint may be assigned a weight (e.g., relative to other constraints of a plurality of second migration constraints, relative to a first migration constraint, etc.) based on predetermined or learned significance of each underlying data point.

In addition to the historical behavior of the application 1002 and the cloud migration preferences 1004, cloud computing characteristics 1008 for each of the plurality of distinct candidate computing clouds may be registered with and/or accessible for analysis by the migration broker 1010. In some examples, the cloud computing characteristics 1008 may be analyzed to identify a third migration constraint, which is a constraint that identifies the characteristics of the candidate computing clouds which may be selected from as migration destinations.

For example, the cloud computing characteristics 1008 may include definitions of the real-world characteristics of each candidate computing cloud that may be selected from to satisfy the first migration constraint and the second migration constraint in a migration. The cloud computing characteristics 1008 may identify the resources available for allocation at each candidate computing cloud. The cloud computing characteristics 1008 may identify the amount of data centers available at each candidate computing cloud. The cloud computing characteristics 1008 may identify the geographic location, zone, and/or region of each of the data centers available at each candidate computing cloud. The cloud computing characteristics 1008 may identify the instance types (e.g., spot, reserved, etc.) supported at each candidate computing cloud. The cloud computing characteristics 1008 may identify the data backup-strategies and/or object storage solutions (e.g., Amazon Web Services S3, Amazon Web Services S3 with Glacier, Amazon Glacier, etc.) supported at each candidate computing cloud. The cloud computing characteristics 1008 may identify resource auto-scaling supported at each candidate computing cloud. The cloud computing characteristics 1008 may identify a native application design for each candidate computing cloud. The cloud computing characteristics 1008 may identify storage choices and hardware specifications available at each candidate computing cloud.

The cloud computing characteristics 1008 may also identify categorizations of strengths, weaknesses, and/or capabilities for each candidate computing cloud. The categorizations may be determined based on an analysis of other characteristics of each candidate computing cloud and/or from historical performance of the computing cloud in previous utilizations of the computing cloud by the administrator, the organization, and/or by other users. The categorizations may include categorizations such as known for low initial cost but exhibits cost bleeds if not manager properly, good environment for container architecture, known for scaling loads, good storage provider for high IPS applications, known for high storage reliability, can be utilized for hosting data and compute instances differently, good for backup storage, etc.

The cloud computing characteristics 1008 may include a costing model of each of the plurality of distinct candidate computing clouds. The costing model may include a comprehensive model of the options at each candidate computing cloud and the costs associated with each of those options. That is, the costing model may provide a schedule of the costs associated with hosting an application at the computing cloud utilizing any available iteration of the services provided by the candidate computing clouds.

The migration broker 1010 may create the migration plan 1012 based on the first migration constraint for the application determined from an analysis of historical behavior of the application 1002 executed on the native computing data center, the second migration constraint for the application determined from an analysis of administrator cloud migration preferences 1004 for the application, and/or the cloud computing characteristic 1008 of each of the plurality of distinct candidate computing clouds. For example, the migration broker 1010 may create the migration plan 1012 to migrate the application to a computing cloud, of the plurality of distinct computing clouds, that satisfies the first migration constraint and the second migration constraint at a cost below a cost threshold.

For example, the migration broker 1010 may analyze the first migration constraint, the second migration constraint, and the cloud computing characteristics to identify a candidate computing cloud, of the plurality of candidate computing clouds, to which to migrate the application based on a determined ability of the candidate computing cloud to fulfill the specifications within the constraints and/or a provide a relative best fit to conflicting or otherwise limiting specifications within the constraints in a cost optimized manner that provides a relative lowest cost. As described above, the first migration constraint and the second migration constraint may be weighted such that the migration broker 1010 may bias its selection of a candidate computing cloud toward fulfillment of particular migration constraints over others.

The migration plan 1012 may be utilized to may be utilized to customize an infrastructure topology template specific to the application and to a particular computing cloud. For example, the infrastructure topology template may specify how to perform the migration of the application to the destination computing cloud, configure resource allocation at the destination computing cloud for the application, configure the application's virtualization architecture at the destination computing cloud, and/or configure application workload execution at the destination computing cloud. The customized infrastructure template may specify the specific destination computing cloud provider, the specific destination computing cloud, the specific destination data center, etc. where the application is to be migrated.

The customized infrastructure topology template may specify a resource allocation assigned to an instance of a workload execution at the candidate computing cloud where the application is to be migrated. The customized infrastructure template may specify auto-scaling attributes which may be utilized at the candidate computing cloud where the application is to be migrated to avoid IT silos and/or over-provisioning. The customized infrastructure template may specify grouping of similar applications able to be grouped to exploit cost reductions associated with reservation purchase models and/or bulk discounts. For example, the customized infrastructure template may specify groups of instances for a specific cloud provider so that some workload instances of the application are migrated to a first computing cloud and other workload instances are migrated to a second computing cloud. The customized infrastructure template may specify groups of instances based on virtualization architecture such that some instances of the application are migrated as a container and some instances of the application are migrated as virtual machines. The customized infrastructure template may specify groups of instances based on the expected average lifecycle of the instance such that some instances of the application are migrated as long-term reserved instances of the application and others are migrated as spot or on-demand instances of the application.

The customized infrastructure topology template may specify a data backup, availability and/or disaster recovery strategy for the application at the candidate computing cloud where the application is to be migrated. The customized infrastructure template may specify a compliance and/or governance plan for the application at the candidate computing cloud where the application is to be migrated. The customized infrastructure template may specify the virtualization architecture for the application at the candidate computing cloud where the application is to be migrated.

The candidate computing cloud identified in the customized infrastructure topology template as the migration destination computing cloud may be configured according to the customized infrastructure topology template. That is, the application instance may be provisioned with computational resources and the parameters of its execution at the identified candidate computing cloud may be configured based on the customized infrastructure topology template for the application at the candidate computing cloud. For example, a customized AWS CloudFormation template may be generated by the migration broker 1010 and utilized to provision the application at an Amazon Web Services computing cloud. In some examples, customized Azure Resource Manager (ARM) template may be generated by the migration broker 1010 and utilized to provision the application at an Azure computing cloud. In some examples, a simple application provisioning request template may be generated by the migration broker 1010 and utilized to provision the application at an Azure computing cloud.

In some examples, instances of an application may be distributed to a plurality of distinct candidate computing clouds. In such examples, different virtualization architectures may be utilized at the different candidate computing clouds. For example, an application workload at a first computing cloud may execute as a virtual machine. Whereas another workload of the same application at a second computing cloud may execute as a container. As such, the migration broker 1010 may create two different templates for the two application instances, each uniquely applicable to one of the candidate computing clouds.

Figure 2:
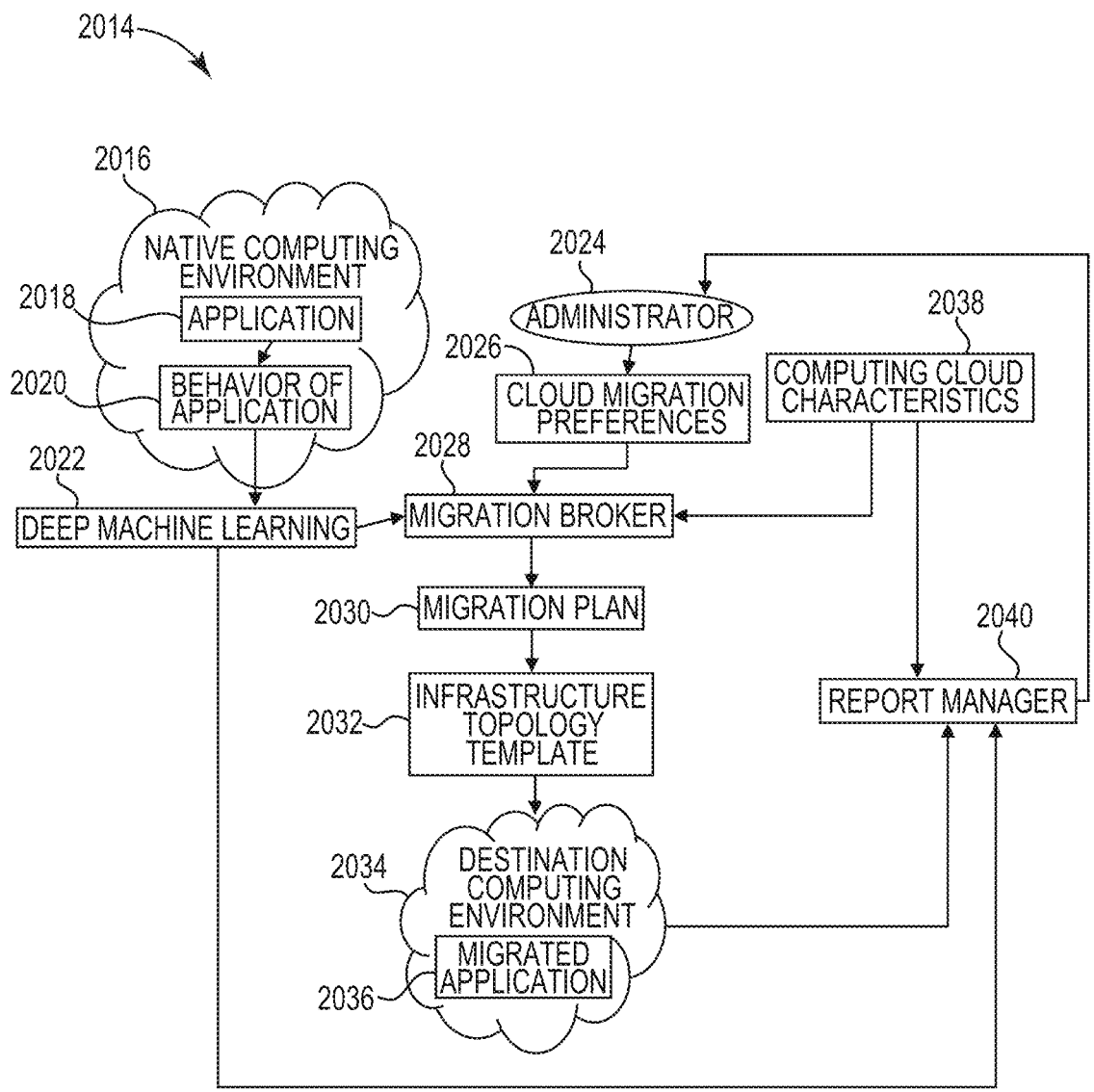
FIG. 2 illustrates an example of a system of application migrations consistent with the present disclosure.

FIG. 2 illustrates an example of a system 2014 of application migrations consistent with the present disclosure. The system 2014 may include components of and/or be utilized with system 1000, the application migration management device 3042 of FIG. 3, the non-transitory memory 4056 of FIG. 4, and/or the method 5062 of FIG. 5.

The system 2014 may include an application 2018. The application 2018 may include a single application and/or a plurality of applications. The application 2018 may include an application 2018 that is executing in and/or has executed in its native computing environment 2016. The native computing environment 2016 may include a data center, such as a private data center, a private cloud, a public cloud, etc., where the application 2018 was initially or historically executing prior to a request or other trigger to migrate the application 2018.

For example, an administrator 2024, such as an IT professional managing application migration, may request initiation of an application migration operation. Additionally, the administrator may input cloud migration preferences 2026 regarding the requested application migration. The cloud migration preferences may include the administrator's preferences regarding cloud data center preferences, preferences regarding separation of application data from compute instances for security and stability, preferences for backup and/or disaster recovery policies, preferences regarding the suitability of the application for containerization, etc. The cloud migration preferences may be provided to a migration broker 2028.

Along with the cloud migration preferences 2026, the administrator 2024 may communicate the credentials that may be utilized to access the historical behavior of the application 2020, such as may be stored in telemetry data of the application 2018 that was collected while the application 2018 executed in the native computing environment 2016.

The behavior of the application 2020 may be submitted to and/or otherwise access by a deep machine learning utility 2022. The deep machine learning utility 2022 may include instructions executable by a processor to analyze the historical behavior of the application 2020, such as through analysis of the telemetry data of the application 2020, to identify behavior patterns of the application 2020, and make predictions regarding future behavior of the application 2020. For example, the deep machine learning utility 2022 may identify historical behavior patterns of the application 2018 from historical executions on the native computing environment 2016. The deep machine learning utility 2022 may identify present characteristics and/or predict future characteristics of the application 2018 from the behavior patterns of the application 2018. For example, the deep machine learning utility 2022 may identify a lifecycle of the application 2018, a data handling compliance and/or governance scheme applicable to the application 2018, a data availability, data backup, and disaster recover scheme applicable to the application 2018, configuration attributes of the application 2018, a computational resource application applicable to the application 2018, etc. The deep machine learning utility 2022 may provide the results of its analysis to a migration broker 2028.

The system 2014 may include computing cloud characteristics 2038 for each of a plurality of candidate destination clouds for the application 2018. The computing cloud characteristics 2038 may include a list and/or a model of the pricing for the services and/or resources for each of a plurality of candidate destination clouds for the application 2018. The computing cloud characteristics 2038 may include attributes and configurations of their corresponding clouds. For example, the computing cloud characteristics 2038 may include cloud service details and/or cloud data center specific details regarding the capacity, location, configuration, behavior, tendencies, etc. of their corresponding computing cloud.

The computing cloud characteristics 2038 may be input by administrator 2024, provided by a computing cloud provider, derived from analysis of historical utilization of computing clouds, derived from analysis of current conditions at the computing clouds, and/or derived by combinations thereof. The cloud characteristics 2038 may be provided to the migration broker 2028.

The migration broker 2028 may include instructions executable by a processor to analyze the output of the deep machine learning utility 2022, the cloud migration preferences 2026 and/or the computing cloud characteristics 208. Analyzing the output of the deep machine learning utility 2022, the cloud migration preferences 2026, and/or the computing cloud characteristics 2038 may include utilizing empirical analysis of each parameter included in these inputs to develop a comprehensive model of the future operation and preferences for the future operation of the application 2018.

The migration broker 2028 may utilize this model to identify an optimal computing cloud data center or data centers to which to migrate the application 2018. The optimal computing cloud data center may include a computing cloud data center that will provide a relatively closest fit to the model at a relatively lowest cost. A cost associated with each potential candidate computing cloud and/or each potential configuration of each potential candidate computing cloud may be forecasted utilizing the costing model. For example, the costing model for a cloud and/or a configuration at a cloud may be applied to the observed and/or predicted behavior patterns determined from the deep machine learning utility 2022 and/or the cloud migration preferences 2026 to predict a cost of executing an instance of the application 2018 at the candidate cloud. An initial cost and/or a cost trend may be forecasted.

The migration broker 2028 may, based on this analysis, create a migration plan 2030. The migration plan 2030 may specify the details of the migration of the application 2018 to a destination computing environment 2034. The migration plan 2030 may specify a cloud provider of the destination computing environment 2034, a specific data center of the of the destination computing environment 2034, a resource allocation request for the application 2018 at the destination computing environment 2034, an auto-scaling request for the application 2018 at the destination computing environment 2034, a grouping scheme for instances of the application 2018 for migration, a data availability, backup, and disaster recovery strategy for the application 2018 at the destination computing environment 2034, a compliance and governance plan applicable to the application 2018 at the destination computing environment 2034, a selection of a virtualization architecture applicable to the application 2018 at the destination computing environment 2034, etc.

The system 2014 may generate, based on the migration plan 2030, an infrastructure topology template for the migration of each application to each destination computing environment 2034. For example, an infrastructure topology template 2032 may be generated for each respective application workload and each an infrastructure topology template 2032 may be specific to a specific data center of a specific cloud provider. The infrastructure topology template 2032 may be utilized to provision computational resources at and/or configure the environment of the corresponding destination computing environment 2034 for migration of an instance of the application 2018 from its native computing environment 2016 to the destination computing environment 2034. The destination computing environment 2034 may include a private data center, a private cloud, a public data center, a public cloud, etc.

Following application of the infrastructure topology template 2032 to the destination computing environment 2034, a migrated instance of the application 2036 may operate on and/or be executed at the destination computing environment 2034 according to the infrastructure topology template 2032. Post migration, provisioned infrastructure details, current costs, data availability, data backup configurations, disaster recover configurations, cost forecasts, notification, alerts, etc. corresponding to the execution of the migrated application 2036 instances at the destination computing environment 2034 may be published to a report manger 2040. The report manager 2040 may include instructions executable by a processor to present the published data to the administrator 2024.

The report manager 2040 may forecast a cost of executing the migrated application 2036 at the destination computing environment 2034. For example, the report manager 2040 may utilize the costing model from the computing cloud characteristics 2038 for the destination computing environment 2034, the patterns of application behavior observed and/or forecasted by the deep machine learning utility 2022, the cloud migration preferences 2026, current consumption behavior and/or consumption trends of the migrated application 2036 instance executing at the destination computing environment 2034, etc. to forecast an initial cost and a trend in cost for executing the migrated application 2036 at the destination computing environment 2034. The cost forecasts may be combined into overall costs, cloud specific costs, application specific costs, etc. for publication back to the administrator 2024.

For example, patterns of application behavior observed and/or forecasted by the deep machine learning utility 2022 may be loaded to the report manager 2040 from an application behavior database where they are stored. The costing model for the destination computing environment may be loaded to the report manager 2040 from a registry database where it is stored including the costing model, the computing cloud characteristics 2038 for the destination computing environment 2034, and/or the cloud migration preferences 2026. The current consumption behavior and/or consumption trends of the migrated application 2036 instance executing at the destination computing environment 2034, the migration plan 2030, and/or the infrastructure topology template 2032 may be loaded to the report manager 2040 from a migrated application attribute database where they are stored. The report manager 2040 may apply an extrapolation model to the loaded data to predict a resource consumption pattern of and/or growth of resource consumption by the migrated application 2036. The report manager 2040 may apply the cloud costing model to the loaded data and/or the predicted consumption to determine and/or publish a forecasted cost model for executing the migrated application 2036 for a period of time at the destination computing environment 2034.

Figure 3:
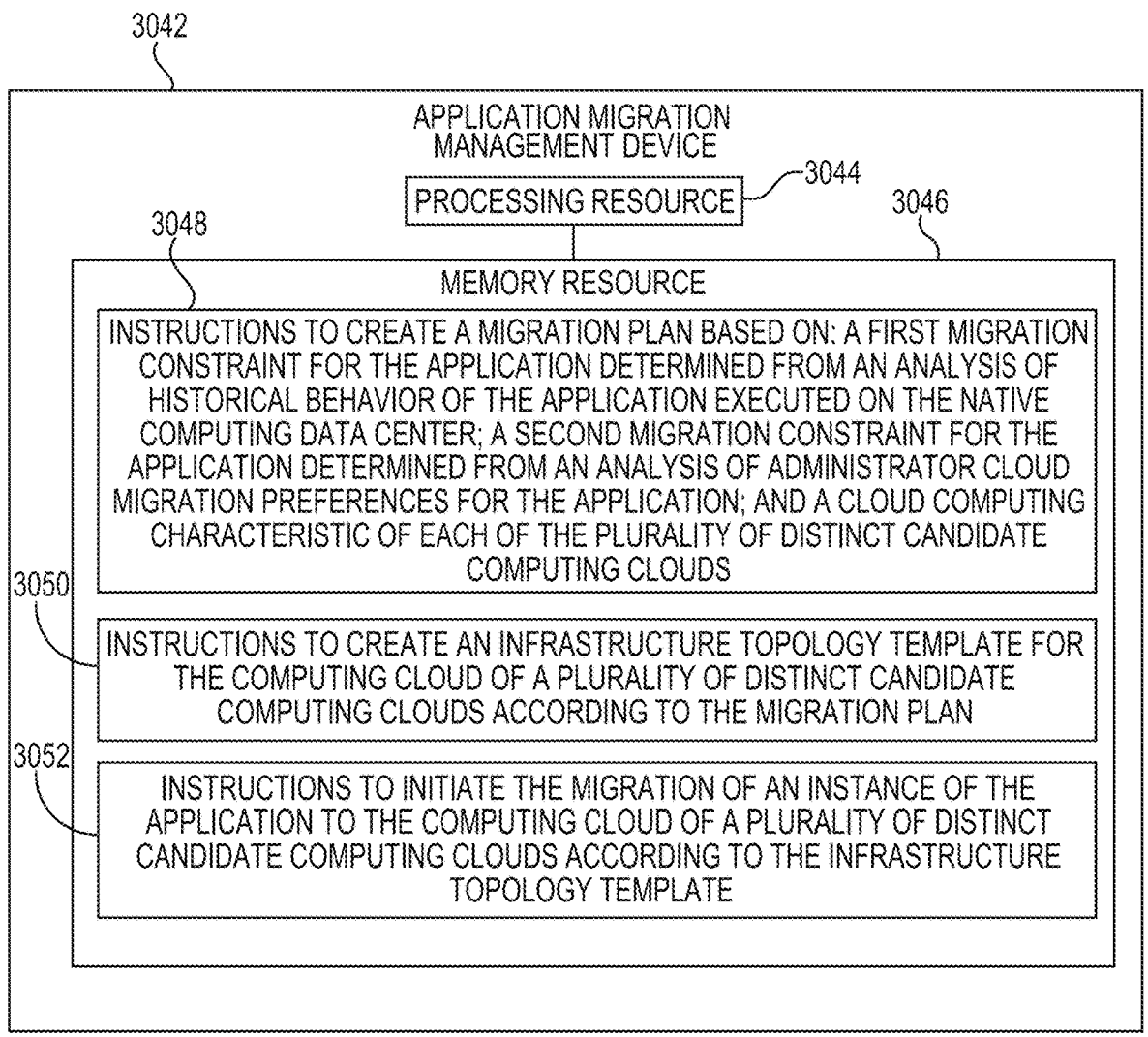
FIG. 3 illustrates an example of an application migration management device consistent with the present disclosure.

FIG. 3 illustrates an example of an application migration management device 3042 consistent with the present disclosure. The application migration management device 3042 may include components of and/or be utilized with system 1000 in FIG. 1, the system 2014 in FIG. 2, the non-transitory memory 4056 of FIG. 4, and/or the method 5062 of FIG. 5.

The application migration management device 3042 may include a computing device. For example, the application migration management device 3042 may include a processing resource 3044 communicatively coupled to a memory resource 3046. The memory resource 3046 may be a non-transitory machine readable medium. The memory resource 3046 may store machine-readable instructions executable by the processing resource 3044 to perform the functionalities described herein. In some examples, the application migration management device 3042 may include a computing device accessible by an administrator to perform data center management functions and/or application management functions for an organization.

The application migration management device 3042 may include instructions 3048 to create a migration plan. The migration plan may include a definition of a set of migration characteristics that define how a migration should proceed. For example, the migration plan may define characteristics of a migration of an application from its native computing data center, where it executed prior to the migration, to a destination computing cloud of a plurality of distinct candidate destination computing clouds.

The migration plan may be created based on constraints surrounding the application and/or its future execution post migration. That is, the migration plan may be a plan that identified a destination computing cloud that meets various constraints related to the application and/or its future execution post migration in a lowest cost manner. For example, the constraints may specify minimum, maximum, average, and/or target resource allocations and/or configurations for executing an instance of the application at the destination computing cloud.

A first migration constraint for the application may be determined from an analysis of historical behavior of the application executed on the native computing data center. The first migration constraint may be an application lifecycle characteristic constraint derived from historical telemetry data collected from an execution of a workload of the application executing on the native computing data center. The first migration constraint may be an application computational resource allocation constraint derived from historical telemetry data collected from an execution of a workload of the application executing on the native computing data center. The first migration constraint may be an application data availability constraint derived from historical telemetry data collected from an execution of a workload of the application executing on the native computing data center. The first migration constraint may be a data handling compliance constraint derived from historical telemetry data collected from an execution of a workload of the application executing on the native computing data center.

A second migration constraint for the application may be determined from an analysis of administrator cloud migration preferences for the application. The second migration constraint may be a computing cloud type preference determined from the administrator cloud migration preferences input by an administrator. The second migration constraint may be an application data and computational instance separation preference for the application determined from the administrator cloud migration preferences input by an administrator. The second migration constraint may be an application data backup policy preference for the application determined from the administrator cloud migration preferences input by an administrator. The second migration constraint may be an ability of the application to convert between a virtual machine architecture and a container architecture determined from the administrator cloud migration preferences input by an administrator. The second migration constraint may be a specification that application data and compute instances for the application should be migrated to separate clouds or cloud data centers.

In addition to the first constraint and the second constraint, the migration plan may be created based on a cloud computing characteristic of each of the plurality of distinct candidate computing clouds. The cloud computing characteristics may include the technical specifications, capabilities, and or costs corresponding to each candidate destination computing cloud. A migration plan may be created that satisfies a portion of the constraints at a cost below a cost threshold. The cost threshold may be a budget amount, input by an administrator, for executing instances of the application. Alternatively, the cost threshold may include a second lowest amount among a plurality of amounts corresponding to a plurality of migrations that would satisfy the constraints.

The application migration management device 3042 may include instructions 3050 to create an infrastructure topology template from the migration plan. The infrastructure topology template may include a customized computing cloud and/or computing cloud data center specific template that may be utilized to provision resources at and/or configure a destination computing cloud for migration and execution of the application.

The application migration management device 3042 may include instructions 3052 to initiate the migration of an instance of the application to the destination computing cloud. The migration of an instance of the application to the destination computing cloud may be initiated and/or performed according to the infrastructure topology template. That is, computational resources at the destination computing cloud may be configured for and/or provisioned to an instance of the application as specified in the infrastructure topology template.

Figure 4:
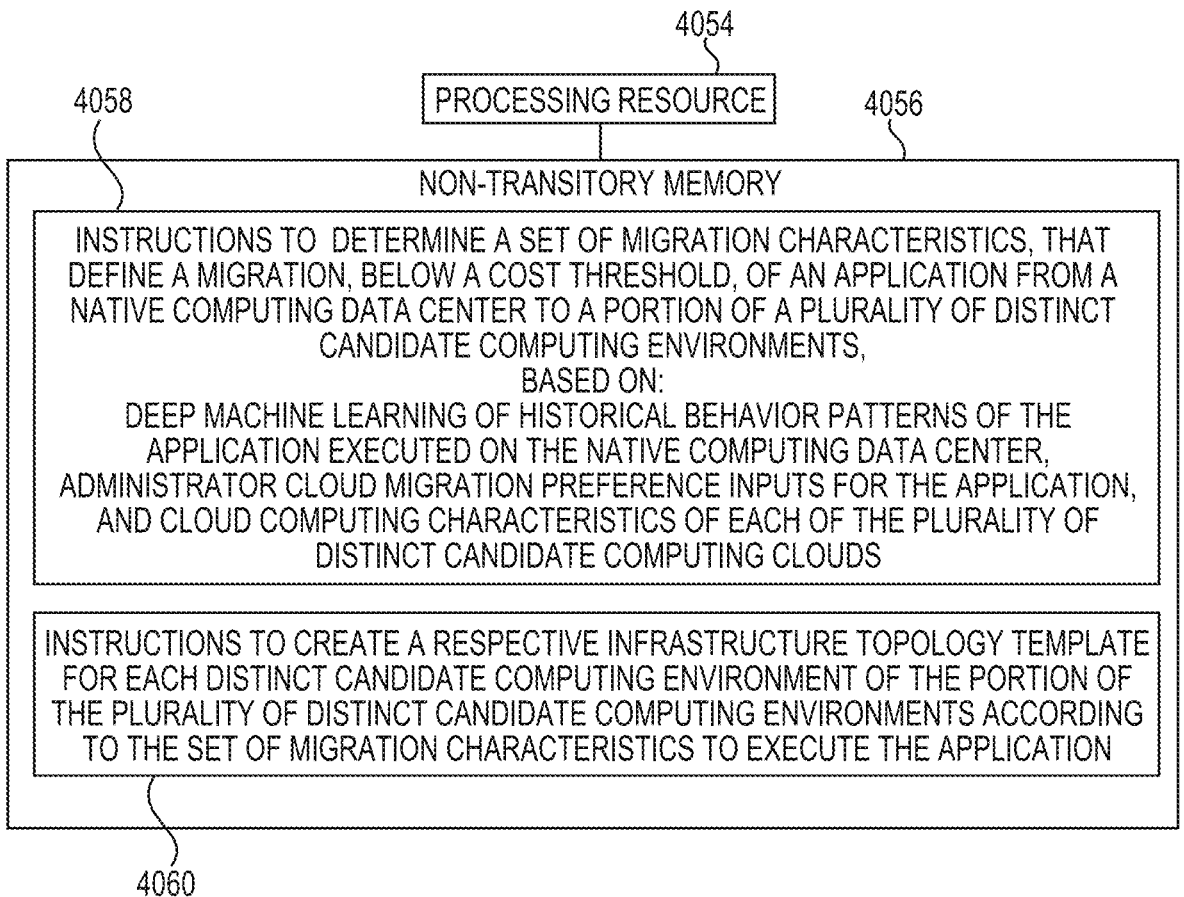
FIG. 4 illustrates an example of a non-transitory machine-readable memory resource and processing resource for application migrations consistent with the present disclosure.

FIG. 4 illustrates an example of a non-transitory machine-readable memory 4056 and processing resource 4054 for application migrations consistent with the present disclosure. non-transitory machine-readable memory 4056 and processing resource 4054 illustrated in FIG. 4 may be utilized by and/or analogous to the elements illustrated in FIGS. 1, 2, 3, and 5. A memory resource, such as the non-transitory memory 4056, may be used to store instructions (e.g., 4058, 4060, etc.) executed by the processing resource 4054 to perform the operations as described herein. The operations are not limited to a particular example described herein and may include additional operations such as those described with regard to the system 1000, system 2014, application migration management device 3042, and the method 5062 described in connection with FIGS. 1, 2, 3, and 5.

The non-transitory memory 4056 may store instructions 4058 executable by the processing resource 4054 to determine a set of migration characteristics. The set of migration characteristics may include a set of characteristics defining migrations. For example, the migration characteristics may define a set of characteristics of a migration that will satisfy constraints to be observed when executing an application at a candidate destination computing cloud. As such, the migration characteristics may define the migration of the application from a native computing data center to a portion of a plurality of distinct candidate computing environments, such as computing clouds and/or computing cloud data centers.

The migration characteristics may be determined based on deep machine learning of historical behavior patterns of the application executed on the native computing data center. The migration characteristics may be determined based on administrator cloud migration preference inputs for the application. The migration characteristics may be determined based on cloud computing characteristics of each of the plurality of distinct candidate computing clouds.

The determined migration characteristics may include migration characteristics of a migration of the application from a native computing data center to a portion of a plurality of distinct candidate computing environments that will satisfy constraints for the application being migrated. For example, a migration characteristic may include a definition of a computational resource utilization demand of the application based on historical patterns of computing resource utilization detected while the application executed on the native computing data center.

Additionally, a migration characteristic may include a definition of a future computational resource utilization demand of a migrated instance of the application based on historical patterns of computing resource utilization detected while the application executed on the native computing data center, administrator cloud migration preferences, and/or other factors (e.g., time of year, holidays, geography, advertisements, etc.). For example, a future modification to the determined computational resource utilization demands of the application may be predicted based on the historical patterns of computing resource utilization detected while the application executed on the native computing data center, administrator cloud migration preferences, and/or other factors. As such, a migration characteristic may include a definition of a computational resource allocation auto-scaling characteristic to be activated for the migrated instance of the application at the destination computing environment to meet the predicted increased future computational resource utilization for the instance.

In addition, a migration characteristic may include a definition a grouping of a set of instances of the application to generate a bulk order cost discount at the plurality of distinct candidate computing environments. The migration characteristic may also define which virtualization technology may be utilized for the migrated instance of the application. For example, the migration characteristic may define whether an application may be instantiated as a virtual machine and/or a container at the candidate computing environments.

The non-transitory memory 4056 may store instructions 4060 executable by the processing resource 4054 to create a respective infrastructure topology template for each distinct candidate computing environment of the portion of the plurality of distinct candidate computing environments. An infrastructure topology template may include a topology template that is applicable to a corresponding candidate computing environment to configure the environment and/or allocate computational resources to an instance of an application being migrated thereto. The infrastructure topology template may be specific to a computing environment such as a specific computing cloud and/or a specific computing data center. The infrastructure topology template may be customized to the particular application being migrated. The infrastructure topology template may be customized according to the migration characteristics to execute an instance of the application at the corresponding destination computing environment. In some examples, the infrastructure topology template may define whether an application may be instantiated as a virtual machine and/or a container at the candidate computing environments. In some examples different instances of the same application executing on different destination computing environments may utilize different virtualization technologies. For example, a first infrastructure topology template for a first distinct candidate computing environment of the portion and a second infrastructure topology template for a second distinct candidate computing environment of the portion may specify different virtualization technologies to be utilized to execute their respective instances of the application in their respective candidate computing environment.

Figure 5:
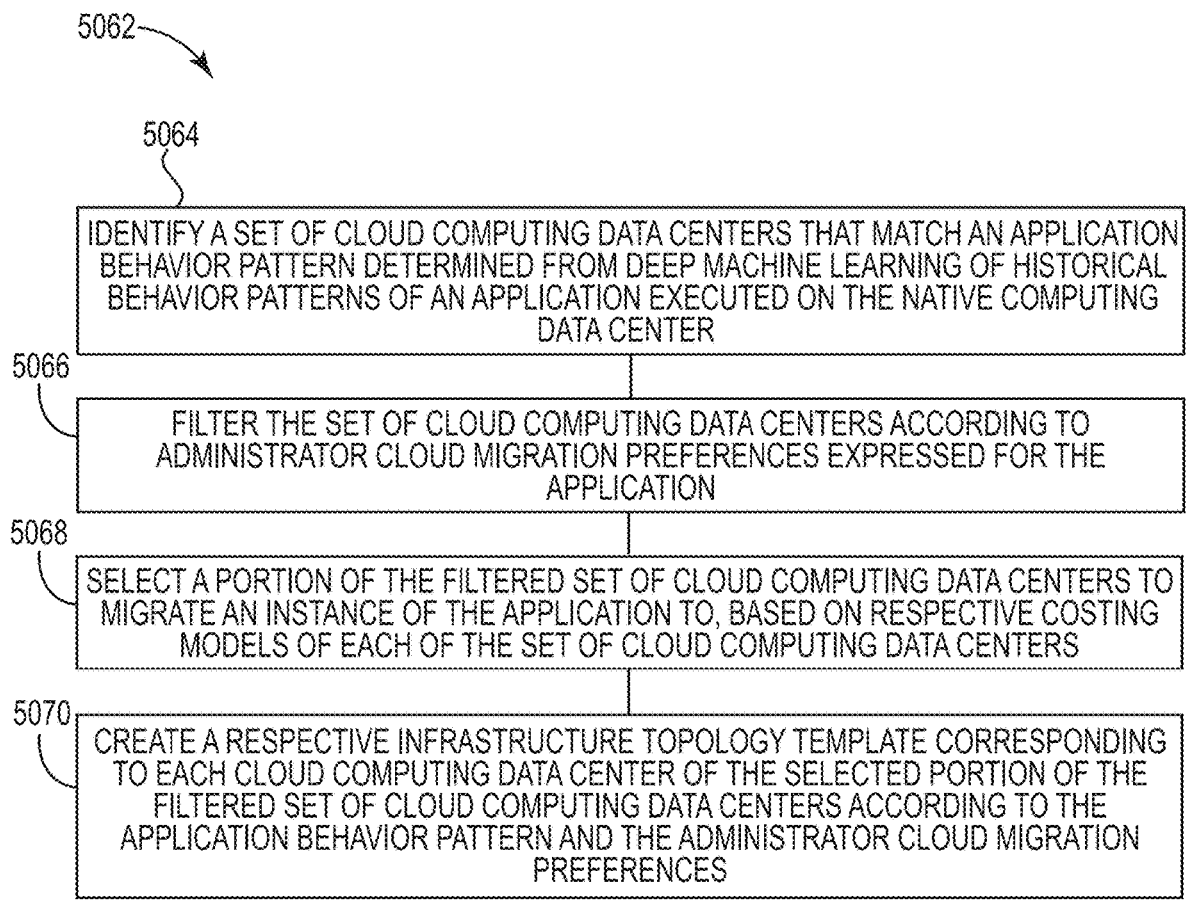
FIG. 5 illustrates an example of a method of application migrations consistent with the present disclosure.

FIG. 5 illustrates an example of a method 5062 for application migrations consistent with the present disclosure. The method 5062 may incorporate elements of and/or be utilized by the system 1000 of FIG. 1, the system 2014 of FIG. 2, the application migration management device 3042 of FIG. 3, and the non-transitory memory 4056 of FIG. 4.

At 5064, the method 5062 includes identifying a set of cloud computing data centers that match an application behavior pattern. The application behavior pattern may be determined from deep machine learning of historical behavior patterns of the application as the application was executed on its native computing data center.

The application behavior pattern may include a pattern and/or trend of computational resource consumption by the application. As such, a set of cloud computing data centers that match the application behavior pattern may include a set of cloud computing data centers that may allocate the computational resources to meet the consumption by the application.

The application behavior pattern may also include a lifecycle of the application, a data availability at the application, data backup strategies at the application, disaster recovery strategies at the application, compliance and governance standards applied at the application, etc. As such, a set of cloud computing data centers that match the application behavior pattern may include a set of cloud computing data centers that can support the application for the duration of the lifecycle, can provide the data availability, can execute the data backup strategy, can execute the disaster recovery strategy, can comply with the compliance and/or governance standards, etc.

At 5066, the method 5062 may include filtering the set of cloud computing data centers. Filtering the set of cloud computing data centers may include reducing the set of cloud computing data centers considered to be selected as destination cloud computing data centers to which an instance of the application may be migrated to a smaller set of filtered cloud computing data centers.

The set of cloud computing data centers may be filtered according to administrator cloud migration preferences expressed for the migration of the application. For example, an administrator may specify preferences such as a preferences of a particular cloud data center to be utilized as the destination cloud computing data center, preferences on separating application data from compute instances for the application, preferences on data backup strategies and disaster recover policies, preferences on whether it is acceptable to containerize an application for migration, etc. The set of cloud computing data centers may be filtered utilizing the administrator cloud migration preferences to remove cloud computing data centers from the set that do not match to or satisfy the administrator cloud migration preferences.

At 5068, the method 5062 may include selecting a portion of the filtered set of cloud computing data centers to migrate an instance of the application to. The portion may be selected based on the respective costing models of each of the set of cloud computing data centers. For example, the costing models of each of the set of cloud computing data centers may be utilized to project a cost of migrating the instance of the application to that cloud computing data center given the configurations and/or allocations determined from the deep machine learning of historical behavior patterns of an application executed on the native computing data center and/or the administrator cloud migration preferences for the application being migrated. Based on the projected cost, a portion of the filtered set of cloud computing data centers may be selected that meet the configurations and/or allocations of executing the migrated application at a cost that is at or below a cost threshold. In an example, the portion of the filtered set of cloud computing data centers may be selected that meet the configurations and/or allocations of executing the migrated application at relatively smallest cost relative to the other cloud computing data centers of the filtered set.

At 5070, the method 5062 may include creating a respective infrastructure topology template corresponding to each cloud computing data center of the selected portion of the filtered set of cloud computing data centers. For example, for each cloud computing data center of the selected portion of the filtered set of cloud computing data centers, a template, corresponding to the particular cloud computing data center, may be customized to migrating the instance of the application to the particular cloud computing data center. The infrastructure topology template may specify how to configure the instance of the application at the particular cloud computing including how to provision the instance for execution and execute the instance. The infrastructure topology template may be created according to the application behavior pattern and the administrator cloud migration preferences. That is, the constraints determined from the application behavior pattern and the administrator cloud migration preferences may be utilized to configure and provision an instance of the application in a manner that satisfies the constraints.

Additionally, a cost of executing the application at the selected portion of the filtered set of the cloud computing data centers may be forecasted. For example, by applying a costing model of a particular cloud computing data center to the configuration and provisioning data included in the infrastructure topology template, a cost associated with executing the migrated instance of the application at the particular cloud computing data center may be determined. The forecasted amount may be published to the administrator. The forecasted cost may be revised according to data collected from the execution of the migrated application instance at the particular cloud computing data center after migration.

Further, the method 5062 may include provisioning instance of the application at each cloud computing data center of the selected portion of the filtered set of cloud computing data centers. The instance of the application may be provisioned at a corresponding cloud computing data center according to the infrastructure topology template corresponding to the application instance and/or the cloud computing data center of the selected portion of the filtered set of cloud computing data centers.

Furthermore, migration status metrics and notifications may be generated and/or determined following the instantiation of application at each cloud computing data center of the selected portion of the filtered set of cloud computing data centers. For example, the resource allocation, application configuration, and/or resource consumption of the migrated instance of the application at the cloud computing data center may be generate and/or determined. Additionally, the execution of the migrated instance of the application at the cloud computing data center may generate notifications relating to the resource allocation, application configuration, and/or resource consumption of the migrated instance of the application. The migration status metric and notifications may be published to the administrator for review.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples

What is claimed:

1. A method comprising:
collect and analyze, by a migration broker, data from a plurality of sources to identify migration constraints associated with migration of an application from a native computing data center to a computing cloud of a plurality of distinct candidate computing clouds, the identified migration constraints including:
a first migration constraint for the application determined from an analysis of historical behavior of the application executed on the native computing data center,
a second migration constraint for the application determined from an analysis of administrator cloud migration preferences for the application, and
a third migration constraint for the application determined from a cloud computing characteristic of each of the plurality of distinct candidate computing clouds, wherein the first, second, and third migration constraints describe constraints that are imposed on migration of the application from the native computing data center to a computing cloud; and
creating, by a processor-based application migration management system, a migration plan defining characteristics of a migration of the application from the native computing data center to a selected computing cloud of the plurality of distinct candidate computing clouds based on the identified migration constraints, wherein creation of the migration plan includes the migration broker to generate a model based on the first, second, and third migration constraints and utilize the model to identify an optimal computing cloud from the plurality of distinct candidate computing clouds.

2. The method of claim 1, further comprising creating an infrastructure topology template for the computing cloud of the plurality of distinct candidate computing clouds according to the characteristics of the migration based at least in part on the migration plan, the topology to be used to provision resources at the computing cloud and configure the computing cloud for the migration.

3. The method of claim 1, further comprising calculating a forecasted cost model for executing the application migrated to the computing cloud.

4. A system, comprising:
a processing resource; and
a non-transitory computer-readable media to store machine-readable instructions to cause the processing resource to:
collect and analyze, by a migration broker, data from a plurality of sources to identify migration constraints associated with migration of an application from a native computing data center to a computing cloud of a plurality of distinct candidate computing clouds, the identified migration constraints including:
a first migration constraint for the application determined from an analysis of historical behavior of the application executed on the native computing data center;
a second migration constraint for the application determined from an analysis of administrator cloud migration preferences for the application; and
a third migration constraint for the application determined from a cloud computing characteristic of each of the plurality of distinct candidate computing clouds, wherein the first, second, and third migration constraints describe constraints that are imposed on migration of the application from the native computing data center to a computing cloud; and
create a migration plan defining characteristics of a migration of the application from the native computing data center to a selected computing cloud of the plurality of distinct candidate computing clouds based on the identified migration constraints, wherein creation of the migration plan further the migration broker to generate a model based on the first, second, and third migration constraints and utilize the model to identify an optimal computing cloud from the plurality of distinct candidate computing clouds.

5. The system of claim 4, wherein the first migration constraint is an application lifecycle characteristic constraint derived from historical telemetry data collected from an execution of a workload of the application executing on the native computing data center.

6. The system of claim 4, wherein the first migration constraint is an application computational resource allocation constraint derived from historical telemetry data collected from an execution of a workload of the application executing on the native computing data center.

7. The system of claim 4, wherein the first migration constraint is an application data availability constraint derived from historical telemetry data collected from an execution of a workload of the application executing on the native computing data center.

8. The system of claim 4, wherein the first migration constraint is a data handling compliance constraint derived from historical telemetry data collected from an execution of a workload of the application executing on the native computing data center.

9. The system of claim 4, wherein the second migration constraint is a computing cloud type preference determined from the administrator cloud migration preferences input by an administrator.

10. The system of claim 4, wherein the second migration constraint is an application data and computational instance separation preference for the application determined from the administrator cloud migration preferences input by an administrator.

11. The system of claim 4, wherein the second migration constraint is an application data backup policy preference for the application determined from the administrator cloud migration preferences input by an administrator.

12. The system of claim 4, wherein the second migration constraint is an ability of the application to convert between a virtual machine architecture and a container architecture determined from the administrator cloud migration preferences input by an administrator.

13. The system of claim 4, wherein the third migration constraint determined from the cloud computing characteristic of each of the plurality of distinct candidate computing clouds includes a costing model of each of the plurality of distinct candidate computing clouds.

14. The system of claim 13, wherein the instructions to create the migration plan include instructions to create the migration plan to migrate the application to the computing cloud of the plurality of distinct candidate computing clouds satisfying the first migration constraint, the second migration constraint, and the third migration constraint at a cost below a cost threshold.

15. The system of claim 4, wherein the non-transitory computer-readable media further stores machine-readable instructions to cause the processing resource to:
create an infrastructure topology template for the computing cloud of the plurality of distinct candidate computing clouds according to the characteristics of the migration based at least in part on the migration plan, the topology to be used to provision resources at the computing cloud and configure the computing cloud for the migration.

16. The system of claim 4, wherein the first, second, and third migration constraints describe preferences, rules, metrics, or conditions that are imposed on migration of the application from the native computing data center to a computing cloud.

17. The system of claim 4, wherein the first, second, and third migration constraints are each assigned a weight based on significance of underlying data points for each migration constraint.

18. A non-transitory machine-readable medium storing instructions that, when executed by a processor, cause the processor to:
collect and analyze, by a migration broker, data from a plurality of sources to identify migration constraints associated with migration of an application from a native computing data center to a computing cloud of a plurality of distinct candidate computing clouds, the identified migration constraints including:
a first migration constraint for the application determined from an analysis of historical behavior of the application executed on the native computing data center, wherein the analysis includes deep machine learning to identify patterns from the historical behavior of the application,
a second migration constraint for the application determined from an analysis of administrator cloud migration preferences for the application, and
a third migration constraint for the application determined from a cloud computing characteristic of each of the plurality of distinct candidate computing clouds, wherein the first, second, and third migration constraints describe constraints that are imposed on migration of the application from the native computing data center to a computing cloud; and
create a migration plan defining characteristics of a migration of the application from the native computing data center to a selected computing cloud of the plurality of distinct candidate computing clouds based on the identified migration constraints, wherein creation of the migration plan includes the migration broker to generate a model based on the first, second, and third migration constraints and utilize the model to identify an optimal computing cloud from the plurality of distinct candidate computing clouds.

19. The non-transitory machine-readable medium of claim 18 further storing instructions to cause the computer processor to:
create an infrastructure topology template for the computing cloud of the plurality of distinct candidate computing clouds according to the characteristics of the migration based at least in part on the migration plan, the topology to be used to provision resources at the computing cloud and configure the computing cloud for the migration.

20. The non-transitory machine-readable medium of claim 18, wherein the first migration constraint is, derived from historical telemetry data collected from execution of a workload of the application executing on the native computing data center: an application lifecycle characteristic constraint, an application computational resource allocation constraint, an application data availability constraint, or a data handling compliance constraint.

21. The non-transitory machine-readable medium of claim 18, wherein the second migration constraint is, based on the administrator cloud migration preferences input by an administrator: a computing cloud type preference, an application data and computational instance separation preference for the application, an application data backup policy preference for the application, or an ability of the application to convert between a virtual machine architecture and a container architecture.

22. The non-transitory machine-readable medium of claim 18 further storing instructions to cause the computer processor to calculate a forecasted cost model for executing the application migrated to the computing cloud.

* * * * *